(12) United States Patent
Asakura et al.

(10) Patent No.: US 8,681,231 B2
(45) Date of Patent: Mar. 25, 2014

(54) CAMERA WITH IMAGE STABILIZATION FUNCTION

(75) Inventors: Naoto Asakura, Chiba (JP); Shigeru Iwamoto, Tokyo (JP); Yoshio Wakui, Saitama (JP); Taizo Matsumasa, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 90 days.

(21) Appl. No.: 13/267,263

(22) Filed: Oct. 6, 2011

(65) Prior Publication Data

US 2012/0086824 A1 Apr. 12, 2012

(30) Foreign Application Priority Data

Oct. 6, 2010 (JP) ................................. 2010-226735

(51) Int. Cl.
*H04N 5/228* (2006.01)
*G03B 17/00* (2006.01)
*G06K 9/00* (2006.01)

(52) U.S. Cl.
USPC ............. 348/208.99; 348/208.4; 348/208.7; 348/208.16; 396/55; 396/24; 396/52; 382/107; 382/255

(58) Field of Classification Search
USPC ............. 348/208.99, 208.11, 208.1, 208.4, 348/208.5, 208.2, 208.7, 208.13, 208.16, 348/154, 155, 352, 402.1, 425.45, 513, 241, 348/207-8.1; 396/13, 24, 52, 55, 419; 382/107, 236, 255
See application file for complete search history.

(56) References Cited

U.S. PATENT DOCUMENTS

| | | | |
|---|---|---|---|
| 7,639,933 B2 | 12/2009 | Seo et al. | |
| 7,826,732 B2 * | 11/2010 | Enomoto | 396/55 |
| 2006/0070302 A1 * | 4/2006 | Seo et al. | 52/6 |
| 2006/0279638 A1 * | 12/2006 | Matsuda et al. | 348/208.7 |
| 2006/0284495 A1 * | 12/2006 | Seo et al. | 310/12 |
| 2007/0236577 A1 * | 10/2007 | Ke et al. | 348/208.99 |
| 2008/0130134 A1 * | 6/2008 | Ishida et al. | 359/698 |

FOREIGN PATENT DOCUMENTS

JP 2007-025616 A 2/2007

* cited by examiner

*Primary Examiner* — Tuan Ho
*Assistant Examiner* — Marly Camargo
(74) *Attorney, Agent, or Firm* — Greenblum & Bernstein, P.L.C.

(57) ABSTRACT

A camera according to the present invention is equipped with an image sensor; an A/D converter that converts analog image-pixel signals read from the image sensor to digital image-pixel signals; an image stabilizer that comprises a coil and a movable member configured to move in a given direction while supporting the image sensor; an image stabilization controller that controls a position of the movable member at given time intervals by sending pulse drive signals through the coil; and a timing adjustment processor that shifts at least one of a rise timing and fall timing of the pulse drive signals from a signal-processing interval associated with an A/D conversion process.

20 Claims, 6 Drawing Sheets

CAMERA WITH IMAGE STABILIZATION FUNCTION

BACKGROUND OF THE INVENTION

1. Field of the Invention

The present invention relates to a camera with an image stabilizer. Especially, it relates to an output control of a drive circuit in the image stabilizer.

2. Description of the Related Art

A camera such as a still/video camera is equipped with an optical image stabilizer to reduce blurring due to the motion of the camera. A lens-based image stabilizer is equipped with an exclusive correction lens for varying the optical path, whereas a body/sensor-based image stabilizer shifts an image sensor relative to the optical system. When a camera motion caused by handshake is detected by a gyroscopic sensor, the image stabilizer shifts the correction lens or image sensor so as to compensate for image blur.

In the case of the sensor-based image stabilizer, a movable platform (stage) with an image sensor and coil is arranged so as to be opposite a fixed plate in the camera body. The movable platform moves in two directions perpendicular to each other, e.g., horizontal and vertical directions. The fixed plate is equipped with a magnet, which is opposite to the coil. When a drive current is applied to the coil, a magnetic field around the coil changes and a magnetic force is created between the magnet and the coil, which shifts the movable plate, i.e., the image sensor relative to the fixed plate. For example, such an image stabilizer is described in JP2007-25616A1.

The motion of the movable platform is feedback-controlled to counteract an image blur precisely. Concretely, an image stabilization controller detects a position of the image sensor at predetermined time intervals (e.g., millisecond-order intervals) by detecting a change in the magnetic field caused by the movement of the movable platform. Then, based on a difference between a target position and the detected position, the controller adjusts or modifies the position of the movable platform by outputting a drive current to the coil.

When the camera is moved due to handshake, the drive current applied to the coil changes by increasing abruptly. This change causes an abrupt change in the magnetic field around the coils, and the change of magnetic field affects electric circuits that are configured on the movable plate. Various components, such as a signal-processing circuit for reading image-pixel signals, an electric power supply circuit, etc., are provided around the image sensor. The change in the magnetic field around the coil produces an inductive current in such electric circuits, creating noise in image-pixel signals. For example, in the case of a CMOS image sensor implementing an A/D converter, a standard electric power voltage level in the electric power supply circuit is modified by the changing magnetic field, which produces a noise pattern in a photographed image.

SUMMARY OF THE INVENTION

An object of the present invention is to provide a camera that is capable of controlling an image stabilizer precisely without any occurrence of noise.

A camera according to the present invention is equipped with an image sensor; an A/D converter that converts analog image-pixel signals read from the image sensor to digital image-pixel signals; an image stabilizer that comprises a coil and a movable member configured to move in a given direction while supporting the image sensor; an image stabilization controller that controls a position of the movable member at given time intervals by sending pulse drive signals through the coil; and a timing adjustment processor that shifts at least one of a rise timing and fall timing of the pulse drive signals from a signal-processing interval associated with an A/D conversion process.

A camera according to another aspect of the present invention is equipped with an image stabilizer that shifts an image sensor or an optical system with respect to an optical axis; an image stabilization controller that controls a position of the image sensor or optical system by sending drive signals to the image stabilizer; and a timing adjustment processor that shifts at least one of a rise timing and fall timing of the drive signals from a signal-processing interval associated with an A/D conversion process to image-pixel signals that are read from the image sensor.

A method for stabilizing an image according to another aspect of the present invention includes: a) controlling a position of an image sensor or an optical system by sending drive signals to an image stabilizer, the image stabilizer shifting the image sensor or optical system with respect to an optical axis; and b) shifting at least one of a rise timing and fall timing of the drive signals from a signal-processing interval associated with an A/D conversion process to image-pixel signals that are read from the image sensor.

BRIEF DESCRIPTION OF THE DRAWINGS

The present invention will be better understood from the description of the preferred embodiments of the invention set forth below together with the accompanying drawings, in which.

DESCRIPTION OF THE PREFERRED EMBODIMENTS

Hereinafter, the preferred embodiments of the present invention are described with reference to the attached drawings.

Figure 1:
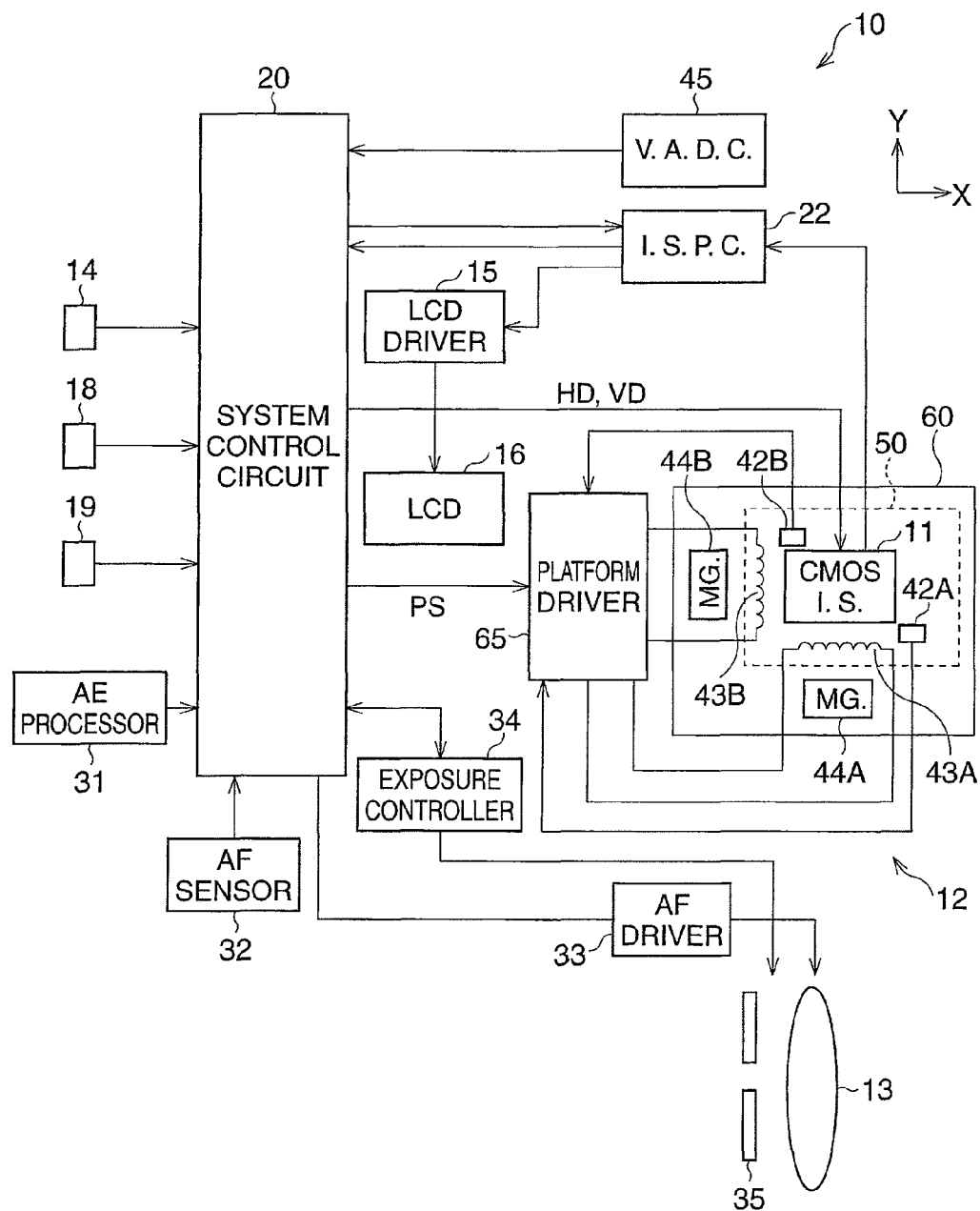
FIG. 1 is a block diagram of a digital camera according to a first embodiment.
Figure 2:
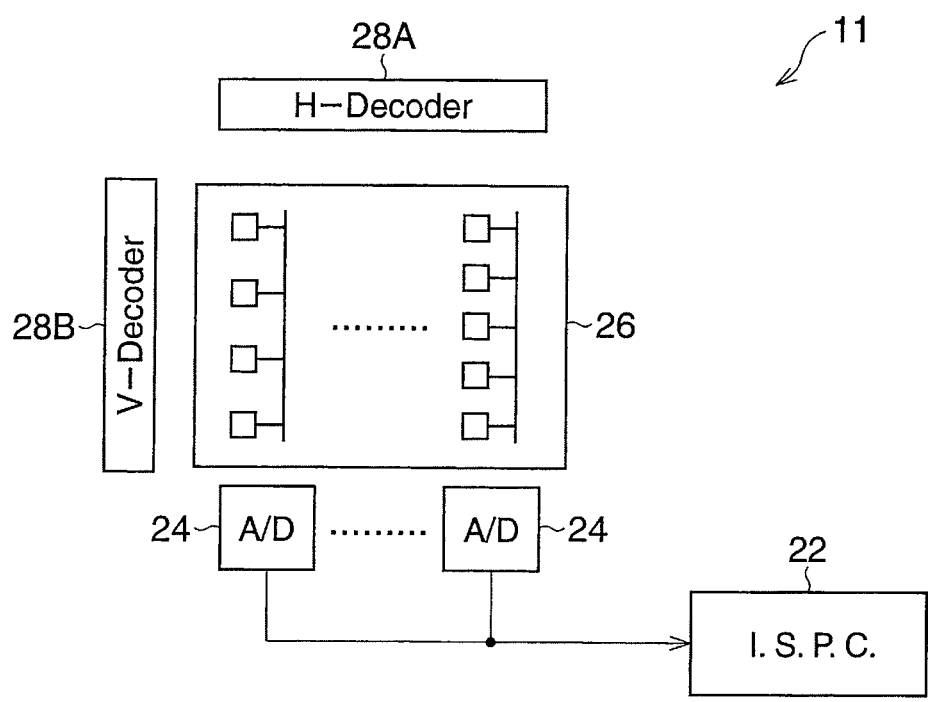
FIG. 2 is a schematic block diagram of a CMOS image sensor.

FIG. 1 is a block diagram of a digital camera according to a first embodiment. FIG. 2 is a schematic block diagram of a CMOS image sensor.

An SLR (Single Lens Reflex) type digital camera 10 is equipped with a CMOS image sensor 11. A mode dial 14 on the camera 10 switches between a picture mode, playback mode, movie mode, etc. When an electric switch button (not shown) is turned ON, the picture mode is set, wherein a through image or live image is displayed on an LCD 16 and a still image can be recorded.

In the picture mode, light passing through a photographing optical system 13 reaches a photo receiving surface of the CMOS image sensor 11. One field/frame worth of analog image-pixel signals are read from the CMOS image sensor at predetermined time intervals (e.g., 1/50 or 1/60 second intervals) and digitized at the same time.

As shown in FIG. 2, the CMOS image sensor 11 is an A/D converter integrated image sensor, in which a column A/D converter 24 is arranged or embedded adjacent to each pixel column (row). The column A/D converter 24 digitizes a reset signal and image-pixel signal using the time-division method, and then obtains the difference. Namely, the column A/D converter 24 functions as a CDS (Correlation Double Sampling) circuit. In each pixel of a pixel block 26, an image-pixel signal is generated. A horizontal shift register 28A and vertical shift register 28B read the image-pixel signals generated in the pixel block 26 line by line. Also, the CMOS image sensor 11 is equipped with an electric supply circuit (not shown), which supplies electric power to the A/D converter 24, etc.

An image signal processing circuit 22 is herein a DSP (Digital Signal Processor) that carries out various image signal processes, including a white balance process, on the digital image-pixel signals read from the CMOS image sensor 11. Thus, movie image data is generated successively.

An LCD driver 15 drives the LCD 16 on the basis of the image data fed from the image signal processing circuit 22. Thus, a through image or a live view image is displayed on the LCD 16. An AE processor 31 detects the brightness of an object, and the image signal processing circuit 22 adjusts the brightness of the through image.

When a release button 18 is depressed halfway, a distance from the object is detected by the AF sensor 32. An AF driver 33 then drives a focusing lens in the photographing optical system 13 to bring an object image into focus. Also, the AE processor 31 calculates exposure values, i.e., a shutter speed and an aperture value.

When the release button 18 is depressed fully, an exposure controller 34 controls an aperture (not shown) and a shutter 35 on the basis of the exposure values. Thus, one frame's worth of image-pixel signals are read from the CMOS image sensor. The image signal processing circuit 22 generates image data of a still image from the read image-pixel signals. The image data is recorded in a memory device (not shown), such as a memory card, via the system control circuit 20.

When the movie-recording mode is set by the mode button 14, a movie image is recorded. Namely, one frame's worth of image-pixel signals are successively read from the CMOS image sensor. The image signal processing circuit 22 generates movie image data and stores it in the memory. When the playback mode is selected, a recorded still image is displayed on the LCD 16.

The system control circuit 20 controls the camera 10 and outputs synchronizing signals (clock pulse signals) to the CMOS image sensor 11, the image-signal processing circuit 22, etc., to adjust the timing of a series of signal-processing procedures. As for the CMOS image sensor 11, horizontal synchronizing signals HD and vertical synchronizing signals VD are output to the CMOS image sensor 11.

The digital camera 10 is equipped with an image stabilizer 12, which is arranged along the optical axis and at the back end of the photographing optical system 13. The image stabilizer 12 is equipped with a rectangular movable platform/plate 50 and a rectangular fixed plate 60. The movable platform 50 can move in the X and Y directions that are perpendicular to one another and defined on a plane perpendicular to the optical axis. The fixed plate 60 is arranged so as to be opposite the movable unit 50. When an image stabilization button 19 is depressed, an image stabilization process is carried out.

The CMOS image sensor 11 is attached at the central portion of the movable platform 50, and voice coils 43A and 43B are arranged along the side of the CMOS image sensor 11 in the X and Y directions, respectively. The fixed plate 60 is close to the movable platform 50 along the optical axis, and has a rectangular aperture corresponding to the size of the light-receiving surface of the CMOS image sensor 11.

The voice coils 43A and 43B function as an electric magnet when a drive current (drive signal) flows through the voice coils 43A and 43B. The voice coils 43A and 43B produce a change in the nearby magnetic field surrounding them. The magnetic interaction between the voice coils 43A and 43B and the permanent magnets 44A and 44B causes the movable platform 50 to move in the X-Y directions.

An angular detecting circuit 45, such as a gyroscopic sensor, detects a motion of the camera 10 (e.g., pitching and yawing). The system control circuit 20 calculates a magnitude of handshake (displacement) on the basis of the detected angular velocity, and shifts the movable platform 50 by outputting a drive signal to a platform driver 65, so as to reduce or counteract image blur.

Magnetic sensors 42A and 42B, for example hole elements, are arranged close to the CMOS image sensor 11 in the X-Y directions, respectively. The magnetic sensors 42A and 42B detect a change in the magnetic field caused by a relative displacement of the permanent magnets 44A and 44B. The system control circuit 20 detects the distance traveled by the movable platform 50 on the basis of the change in the magnetic field.

While the image stabilization functions are underway, the angular velocity detecting circuit 45 successively outputs an angular velocity signal to the system control circuit 20. The system control circuit 20 controls the image stabilizer 12 at predetermined time intervals (herein, a few milliseconds). Concretely, the system control circuit 20 carries out a feedback control procedure with respect to the position of the movable platform 50, based on a gap between the detected actual relative position of the movable platform 50 and a target relative position that is obtained from the detected angular velocity signal.

The platform driver 65 outputs a drive signal to the voice coils 43A and 43B in accordance with the above predetermined time intervals. Herein, the platform driver 65 outputs a pulse drive signal based on a PWM control. The system control circuit 20 sets and adjusts the output timing of the pulse drive signal. As described later, the output timing of the pulse drive signal is outside of an A/D conversion processing interval. The system control circuit 20 adjusts the output timing of the pulse drive signal. Specifically, the pulse drive signal is synchronized with a horizontal synchronization signal HD for reading image-pixels signals.

Figure 3:
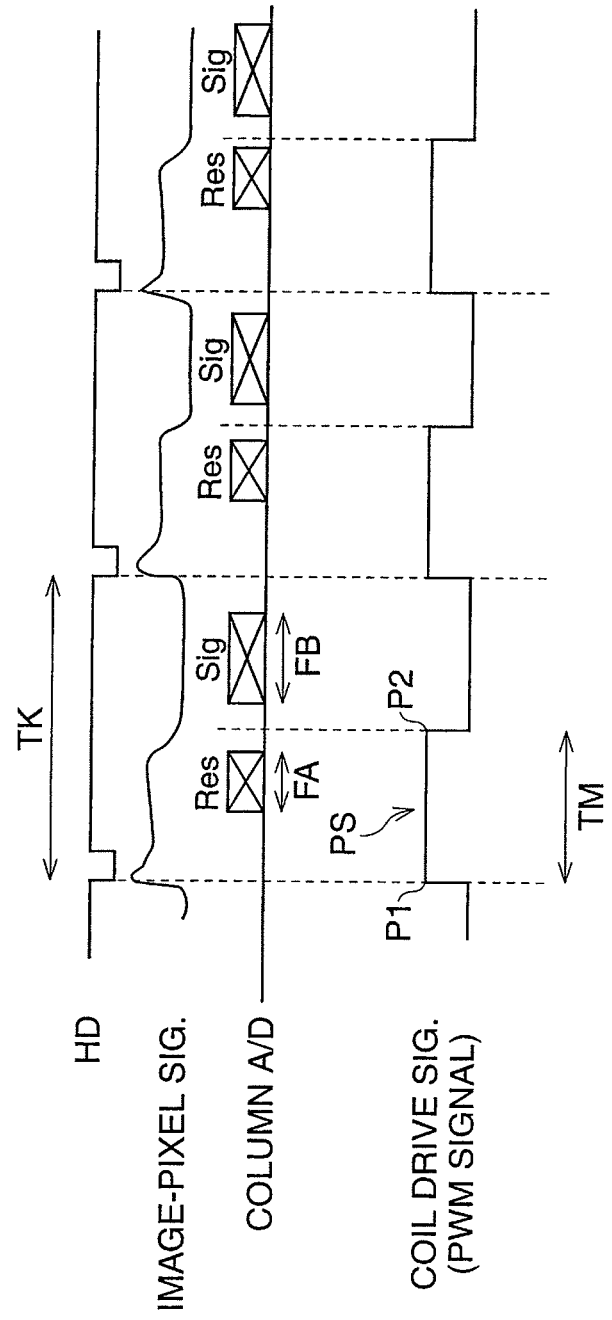
FIG. 3 is a timing chart of image-pixel signals and pulse drive signals according to the first embodiment.

FIG. 3 is a timing chart of image-pixel signals and pulse drive signals. The output timing of the pulse drive signals is explained with reference to FIG. 3.

Analog image-pixel signals are transferred to digital signals in one line, in accordance to the horizontal signal HD. In the column A/D converter 24 shown in FIG. 2, a reset signal is initially sampled or digitized before image-pixel signals are subsequently sampled. As shown in FIG. 3, two signal processing intervals corresponding to the column A/D converter 24 are included in the period "TK" of the horizontal signal HD. An interval for converting the reset signal is designated as "FA" and an interval for converting one line worth of image-pixel signals is designated as "FB".

During the image stabilization process, the sequence of pulse drive signals PS is output regularly, as shown in FIG. 3. Note that only the pulse drive signals output by one voice coil, either 43A or 43B, are illustrated herein. The output time interval "TM" of the pulse drive signals PS is synchronized with the horizontal signals HD, which are sufficiently shorter than the period for reading one frame's worth of image-pixel signals. The period (frequency) of the pulse drive signals PS corresponds to a period for reading and digitally converting one line's worth of image-pixel signals. The pulse drive signals PS are output in accordance with PWM (Pulse Width Modulation) control. The duty ratio of the pulse drive signals PS is, for example, set to 0.4 (40 percent).

Specifically speaking, the positive edge P1 of the pulse drive signal PS, which corresponds to a rise timing of the pulse drive signals, coincides with the output timing of the horizontal signal HD. The rise timing of the pulse drive signal PS is outside of the conversion interval FA of the reset signal and the conversion interval FB of the one frame's worth of image-pixel signals. Furthermore, the negative edge P2, i.e., fall timing of the pulse drive signal PS is also outside of the conversion intervals FA and FB. The duty ratio of the pulse drive signals PS that decides the ON-interval "TM" is predetermined such that both the rise and fall timings are outside of the conversion intervals FA and FB.

In the voice coils 43A and 43B, drive currents change with respect to the ON-timing P1 and OFF-timing P2 of the pulse drive signal PS. Consequently, a change in the magnetic field occurs around the voice coils 43A and 43B. When the magnitude of the camera movement is substantial, the drive currents change abruptly. The change in the magnetic field affects an area neighboring the voice coils 43A and 43B that includes the column A/D converter 24. Especially, the change in the magnetic field feeds an induction current into wiring connected to the electric supply circuit, which produces a change in the standard electric voltage powering the CMOS image sensor 11.

However, the change in the voltage level of the CMOS image sensor 11 occurs outside of the conversion intervals FA and FB. The change in the magnetic field does not have any effect on the standard voltage level during the conversion intervals FA and FB. Consequently, noise does not occur in the image-pixel signals that are generated.

In this way, in the present embodiment, the camera 10 is equipped with the COMS image sensor 11 with the column A/D converter 24 and the image stabilizer 12. The image stabilizer 12 is equipped with the movable platform 50 holding the COMS image sensor 11 and the voice coils 43A and 43B and the fixed plate 60 having the permanent magnets 44A and 44B. Then, the image stabilization process is performed at the predetermined time intervals in response to the motion of the camera 10. At this time, the rise timing and fall timing of the pulse drive signals PS is synchronous with the horizontal synchronization signals HD and outside of the A/D conversion interval FA for the reset signal and the A/D conversion interval FB for image-pixel signals.

Generally, an A/D conversion interval for a reset signal and an A/D conversion interval for image-pixel signals vary with characteristics of an A/D converter, an electric circuit, an image sensor, and etc. Therefore, the duty ratio of the pulse drive signals may be optionally set in accordance to such characteristics. Also, the duty ratio may be set such that either rise timing or fall timing is outside of the conversion intervals FA and FB. This restricts an occurrence of a noise sufficiently.

Next, a digital camera according to a second embodiment is explained with reference to FIG. 4. The second embodiment is different from the first embodiment in that the frequency of pulse drive signals is an integral multiple of the frequency of the horizontal synchronizations signal during a live view. Other constructions are substantially the same as those of the first embodiment.

Figure 4:
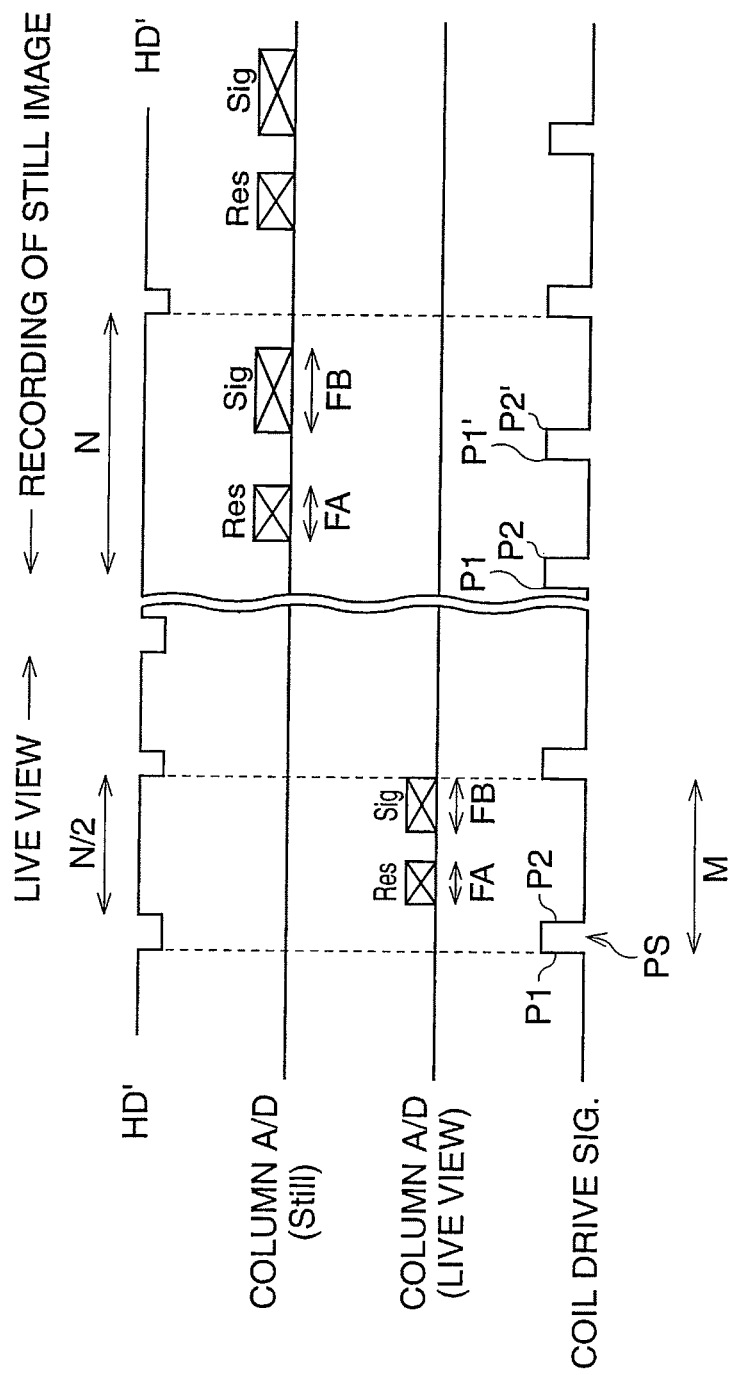
FIG. 4 is a timing chart of pulse drive signals according to the second embodiment.

FIG. 4 is a timing chart of pulse drive signals according to the second embodiment.

In the second embodiment, the period of the horizontal synchronization signals HD' is different between the live view interval and the interval for recording a still image. During the live view, the period is set to one half of the period "N" during the recording process interval. In other words, the frequency of the horizontal synchronization signals HD' during the live view is twice the frequency of the recording interval. By setting the high frame rate during the live view, the camera can display a movie image without discontinuity even if a target object moves.

The pulse drive signals PS are synchronized with the horizontal synchronization signals HD' during the live view. Therefore, the period of the pulse drive signals PS "M" is equal to "N/2". During the live view, ON/OFF switch timing "P1" and "P2" of the pulse drive signal PS is outside of the conversion interval FA for the reset signal and the conversion interval FB for one line's worth of image-pixel signals. The duty ratio of the pulse drive signals PS is predetermined such that the negative edge P2 is just outside of the interval FA.

The period (frequency) of the pulse drive signals PS during the recording process interval is the same as that during the live view interval. Namely, the period is "N/2". The same duty ratio is used during the live view interval and the recording process interval. Consequently, the two positive edges P1 and P1' and one negative edge P2 of the pulse drive signals PS are outside of the conversion intervals FA and FB. Thus, the occurrence of noise due to the pulse drive signals PS is restricted.

Herein, the period "M" of the pulse drive signals PS is one-half of the period "N" of the horizontal synchronization signals HD' "N". However, the period "M" can be set such that "N" is an integer multiple of "M" (N=K×M). In this case, the duty ratio may be set such that part of the pulse drive signals is outside of the conversion intervals FA and FB.

Next, a digital camera according to a third embodiment is explained with reference to FIGS. 5 and 6. The third embodiment is different from the first and second embodiments in that phase-shifted pulse drive signals are output. Other constructions are substantially the same as those of the first and second embodiments.

Figure 5:
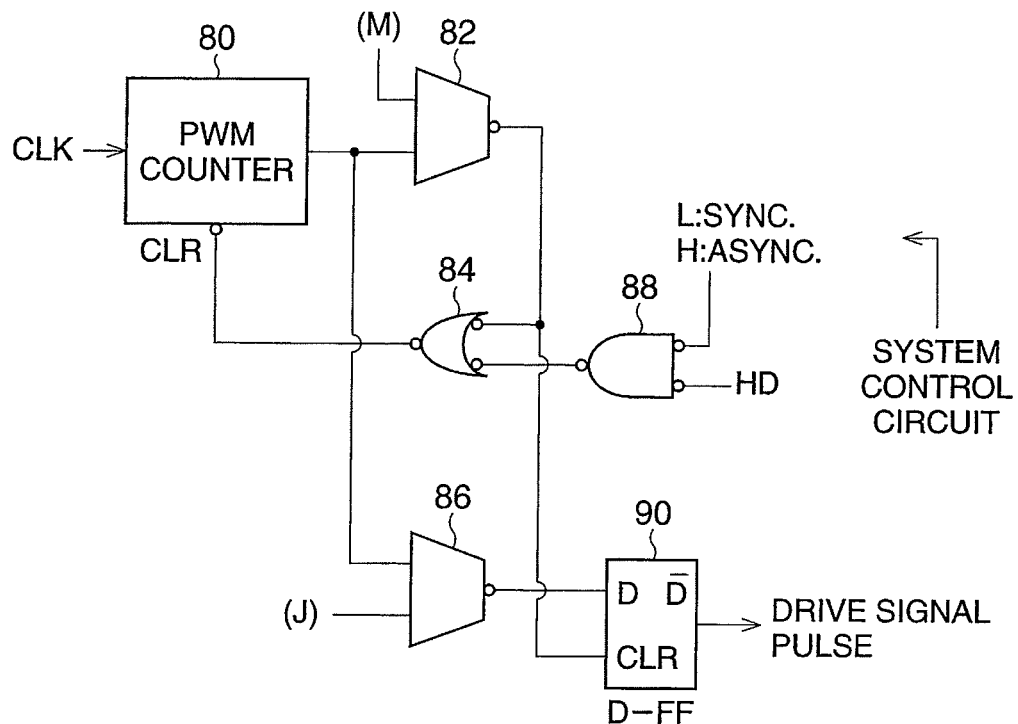
FIG. 5 is a diagram of a logic circuit including a timing adjustment circuit for pulse drive signals according to a third embodiment.

FIG. 5 is a diagram of a logic circuit including a timing adjustment circuit for pulse drive signals. FIG. 6 is a timing chart of pulse drive signals according to the third embodiment.

A PWM counter 80 is connected to comparators 82 and 86, and to a logic circuit 84. Also, a D flip-flop circuit 90 is connected to the comparator 86. The frequency of the clock pulse signals (CLK) that operate each circuit is herein sufficiently larger than the period of the horizontal synchronization signals HD.

During the live view mode, the pulse drive signals are asynchronously output relative to the horizontal synchronization signals HD. The PWM counter 80 counts the periods M of the asynchronous pulse drive signals. The comparator 82 detects whether the count based on the CLK has reached the end of period M of the pulse drive signals PS. Meanwhile, the other comparator 86 detects whether the count has reached the end of an interval "J" of the pulse drive signals. Note that the interval "J" represents an ON-interval of the pulse drive signals in the asynchronous mode. The position of the ON/OFF switch governing the pulse drive signals depends on whether or not the switch of a level of signal output from the D flip-flop circuit 90 is switched.

When the release button is depressed fully, the live view is finished and the recording process begins. Thus, when the level of a signal output to the logic circuit 84 is switched from High level to Low level, an output state of the logic circuit 84 is changed so that the count performed by the PWM counter 80 is reset while synchronizing with the horizontal synchronization signals HD.

As described above, the pulse drive signals PS are asynchronous with the horizontal synchronization signals HD during the live view. When the release button is depressed fully, the pulse count process of the PWM counter 80 is reset to a state that corresponds to a Low Level horizontal synchronization signal HD.

Figure 6:
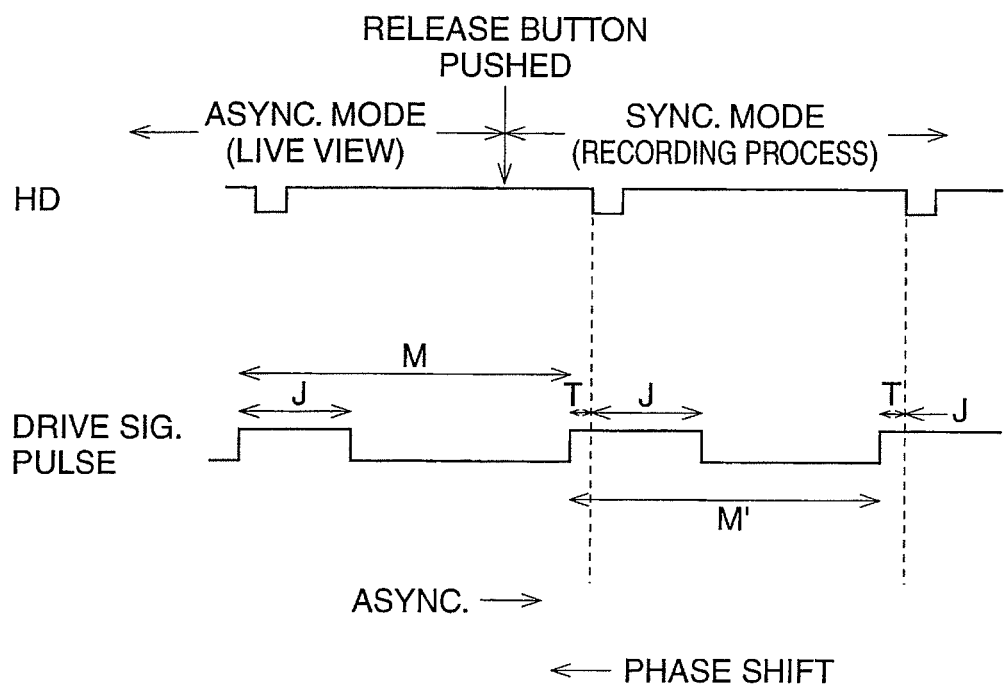
FIG. 6 is a timing chart of pulse drive signals according to the third embodiment.

On the other hand, as shown in FIG. 6, the pulse drive signal PS is switched to the ON level before the horizontal synchronization signal HD is switched to the ON level. Then, an interval "T" is counted by the PWM counter 80 before the PWM counter 80 is reset. Consequently, ON-interval of the clock pulse signals S is relatively long by the interval T relative to the ON-interval during the live view mode. In FIG. 6, the period during the recording process is designated as "M'".

The period "M'" of the pulse drive signals PS is the same as the period of the horizontal synchronization signals HD. On the other hand, the phase difference corresponding to the interval "T" relative to the horizontal synchronization signals is constant during the recording process. This indicates that the pulse drive signals PS are substantially synchronous in a phase-shifted state. Namely, the rise timing and fall timing do not change in the time series relative to the conversion intervals FA and FB. Therefore, the duty ratio can be determined easily such that the rise timing and fall timing are outside of the conversion intervals FA and FB.

Such phase-shifted synchronization may be applied to a mode other than the live view. In this case, the pulse drive signals PS are asynchronous with respect to the horizontal synchronization signals HD (AM≠N). However, during the recording process the pulse drive signals PS are substantially synchronous. In the third embodiment the mode is switched between the asynchronous mode and synchronous mode.

The output timing of the pulse drive signals PS may be set based on synchronization signals other than the horizontal synchronization signals or may be set without utilizing the horizontal synchronization signals HD. In the first and second embodiments, the output timing of the pulse drive signals may be synchronous with the horizontal synchronization signals HD with a phase shift, as shown in the third embodiment. On the other hand, in the third embodiment, the output timing of the pulse drive signals may be synchronous with the horizontal synchronization signals HD as shown in the first and second embodiment.

Driving signals other than pulse signals may be applied. In this case, the output timing of the drive signals may be outside of the conversion intervals. Also, the output timing of the pulse drive signals may be outside of the conversion intervals during the recording processing interval. Furthermore, the output timing of the pulse drive signals may be outside of the conversion intervals FA and FB while one frame's worth of image-pixel signals are read from the COMS image sensor.

As for the image sensor, various image sensors including X-Y independent type image sensor may be optionally applied in place of the CMOS image sensor. Also, an A/D converter other than the column A/D converter may be applied. Furthermore, an A/D converter may be arranged in an area apart from the image sensor in the movable platform, or a circuit board that is not implemented in the image sensor or movable platform.

The switch between the asynchronous mode and the synchronous mode may be applied to various modes. For example, the synchronous mode may be applied during the movie image recording mode. Also, a fall timing of the pulse drive signals may be prioritized to shift from the A/D conversion intervals.

Any type coil other than a voice coil may be optionally applied. Also, any type body/lens-based image stabilizer that drive an image sensor or lens by driving signals may be optionally applied. For example, an image stabilizer in which coil is incorporated in a fixed plate may be applied.

Finally, it will be understood by those skilled in the arts that the foregoing description is of preferred embodiments of the device, and that various changes and modifications may be made to the present invention without departing from the spirit and scope thereof.

The present disclosure relates to subject matter contained in Japanese Patent Application No. 2010-226735 (filed on Oct. 6, 2010), which is expressly incorporated herein by reference, in its entirety.

The invention claimed is:

1. A camera comprising:
   an image sensor;
   an A/D converter that converts analog image-pixel signals read from said image sensor to digital image-pixel signals;
   an image stabilizer that comprises a coil and a movable member configured to move in a predetermined direction while supporting said image sensor;
   an image stabilization controller that controls a position of said movable member at predetermined time intervals by sending pulse drive signals through said coil; and
   a timing adjustment processor that shifts at least one of a rise timing and fall timing of the pulse drive signals from a signal-processing interval, the signal processing interval associated with an A/D conversion process for one line of image-pixel signals, an output time interval of the pulse drive signals is shorter than an output time interval of a horizontal synchronization signal.

2. The camera of claim 1, wherein said timing adjustment processor outputs the pulse drive signals while synchronizing the pulse drive signals with the horizontal synchronization signals associated with a reading of image-pixel signals.

3. The camera of claim 2, wherein said timing adjustment processor shifts a phase of the pulse drive signals relative to the horizontal synchronization signals.

4. The camera of claim 1, wherein said timing adjustment processor shifts at least one of the rise timing and fall timing when carrying out a still image recording process.

5. The camera of claim 1, wherein the period of the pulse drive signals is an integer multiple of the period of the horizontal synchronization signals where a still image is recorded.

6. The camera of claim 1, wherein the pulse drive signals are asynchronous with the horizontal synchronization signals while a still image is not recorded.

7. The camera of claim 6, wherein a mode is switched between an asynchronous mode and a synchronous mode with or without a phase shift.

8. The camera of claim 7, wherein said timing adjustment processor comprises a pulse counter, said pulse counter resetting counts in response to the horizontal synchronization signals.

9. The camera of claim 1, wherein said timing adjustment processor shifts at least one of the rise timing and fall timing from at least one of a conversion interval of a reset signal and a conversion interval of image-pixel signals.

10. The camera of claim 1, wherein said A/D converter is arranged on said movable member.

11. The camera of claim 1, wherein said image sensor is an X-Y address type image sensor, said image sensor implementing said A/D converter inside.

12. The camera of claim 1, wherein said coil is arranged along a movement direction of said image sensor.

13. The camera of claim 1, wherein said image stabilizer comprises a fixed member that comprises a magnet and is opposite to said movable member, said coil being arranged on said movable member.

14. An apparatus for stabilizing an image, comprising:
an image stabilizer that comprises a coil and a movable member configured to move in a predetermined direction while supporting an image sensor;
an image stabilization controller that controls a position of said movable member at predetermined time intervals by sending pulse drive signals through said coil; and
a timing adjustment processor that shifts at least one of a rise timing and fall timing of the pulse drive signals from a signal-processing interval, the signal processing interval associated with an A/D conversion process for one line of image-pixel signals that are read from said image sensor, an output time interval of the pulse drive signals is shorter than an output time interval of a horizontal synchronization signal.

15. An apparatus for stabilizing an image, comprising:
an image stabilizer that shifts an image sensor or an optical system with respect to an optical axis;
an image stabilization controller that controls a position of said image sensor or optical system by sending drive signals to said image stabilizer; and
a timing adjustment processor that shifts at least one of a rise timing and fall timing of the drive signals from a signal-processing interval, the signal processing interval associated with an A/D conversion process for one line of image-pixel signals that are read from said image sensor, an output time interval of the pulse drive signals is shorter than an output time interval of a horizontal synchronization signal.

16. The apparatus of claim 15, wherein said timing adjustment processor synchronizes an output timing of the drive signals with synchronization signals associated with at least one of a reading of image-pixel signals and A/D conversion process.

17. The apparatus of claim 16, wherein said timing adjustment processor shifts a phase from the synchronization signals.

18. A method for stabilizing an image, comprising:
controlling a position of an image sensor or an optical system by sending drive signals to an image stabilizer, the image stabilizer shifting the image sensor or the optical system with respect to an optical axis; and
shifting at least one of a rise timing and fall timing of the drive signals from a signal-processing interval, the signal processing interval associated with an A/D conversion process for one line of image-pixel signals that are read from said image sensor, an output time interval of the pulse drive signals is shorter than an output time interval of a horizontal synchronization signal.

19. A camera comprising:
an image sensor;
an A/D converter that converts analog image-pixel signals read from said image sensor to digital image-pixel signals;
an image stabilizer that comprises a coil and a movable member configured to move in a predetermined direction while supporting said image sensor;
an image stabilization controller that controls a position of said movable member at predetermined time intervals by sending pulse drive signals through said coil; and
a timing adjustment processor that shifts at least one of a rise timing and fall timing of the pulse drive signals from a signal-processing interval, associated with an A/D conversion process,
said timing adjustment processor outputs the pulse drive signals while synchronizing the pulse drive signals with horizontal synchronization signals associated with a reading of image-pixel signals, and shifts a phase of the pulse drive signals relative to the horizontal synchronization signals.

20. An apparatus for stabilizing an image, comprising:
an image stabilizer that shifts an image sensor or an optical system with respect to an optical axis;
an image stabilization controller that controls a position of said image sensor or optical system by sending drive signals to said image stabilizer; and
a timing adjustment processor that shifts at least one of a rise timing and fall timing of the drive signals from a signal-processing interval, the signal processing interval associated with an A/D conversion process of image-pixel signals that are read from said image sensor,
said timing adjustment processor synchronizes an output timing of the drive signals with synchronization signals associated with at least one of a reading of image-pixel signals and A/D conversion process, and shifts a phase from the synchronization signals.

* * * * *